Oct. 21, 1952　　　G. F. NADEAU ET AL　　　2,614,932

PHOTOGRAPHIC STRIPPING FILM

Filed April 1, 1949

FIG. 1.

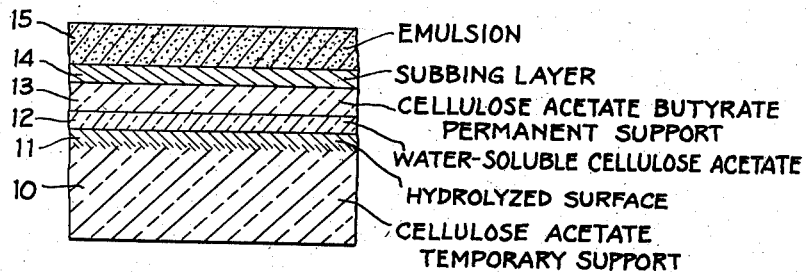

- 15 — EMULSION
- 14 — SUBBING LAYER
- 13 — CELLULOSE ACETATE BUTYRATE PERMANENT SUPPORT
- 12 — WATER-SOLUBLE CELLULOSE ACETATE
- 11 — HYDROLYZED SURFACE
- 10 — CELLULOSE ACETATE TEMPORARY SUPPORT

FIG. 2.

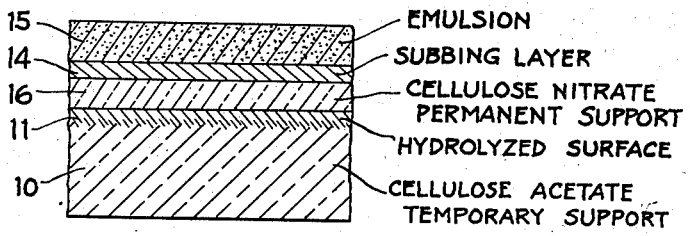

- 15 — EMULSION
- 14 — SUBBING LAYER
- 16 — CELLULOSE NITRATE PERMANENT SUPPORT
- 11 — HYDROLYZED SURFACE
- 10 — CELLULOSE ACETATE TEMPORARY SUPPORT

GALE F. NADEAU
CLEMENS B. STARCK
CARL F. SMITH
INVENTORS

BY Daniel I. Mayne
W. H. McDowell
ATTORNEY & AGENT

Patented Oct. 21, 1952

2,614,932

UNITED STATES PATENT OFFICE 2,614,932

PHOTOGRAPHIC STRIPPING FILM

Gale F. Nadeau, Clemens B. Starck, and Carl F. Smith, Rochester, N. Y., assignors to Eastman Kodak Company, Rochester, N. Y., a corporation of New Jersey Application April 1, 1949, Serial No. 85,002

4 Claims. (Cl. 95—9)

This invention relates to a photographic stripping film of the type in which an emulsion and its permanent support are carried by a temporary support from which they are stripped together.

Stripping films of the type described in the Nadeau U. S. Patent 2,143,791, granted January 10, 1939, employing glue stripping layers have been fairly satisfactory but do not meet the requirements of the trade to the desired extent. In the uses to which such films are put, it is highly desirable that the film possess among other characteristics the property of stripping apart quickly and possessing high dimensional stability. Previously, most stripping films depended for speedy stripping upon the rate at which moisture would penetrate the permanent support and reach the soluble stripping layer. Generally, it was required that the permanent support be moisture permeable or relatively thin. Therefore dimensional stability was poor. We have discovered a method of adhering the permanent and temporary supports of a stripping film such that stripping is substantially independent of the moisture permeability characteristics of the permanent support and depends more upon the bonding between the two supports.

Also we have discovered that the dimensional stability of the stripping film is influenced mainly by the dimensional change of the temporary support when the bond between the two is so great that stripping does not occur. Our method of overcoming these difficulties will be apparent from the following description of our invention.

One object of our invention is to provide improved methods for overcoming these and other difficulties. Other objects include methods for providing stripping films of higher quality at lower cost.

These objects are accomplished principally by releasably attaching a thin sensitized film to the hydrolyzed surface of a cellulose ester temporary support.

Reference is made to the accompanying drawings where:

Fig. 1 is an enlarged cross-sectional view of a stripping film of our invention having cellulose ester permanent and temporary supports united by means of a soluble cellulose ester stripping layer.

Fig. 2 is a similar view of a stripping film having a cellulose ester permanent support adhering directly to the hydrolyzed surface of a cellulose ester temporary support.

The following examples are illustrative of our invention.

Example 1

It was conceived that if a rapidly water-soluble cellulose ester such as hydrolyzed cellulose acetate was used for the stripping layer, many problems would be solved. However, it was not obvious how to adhere water-soluble cellulose ester to a well-esterified cellulose ester temporary support or how to adhere a cellulose ester permanent support to the water-soluble stripping layer. Conceivably the former could be accomplished by application to the temporary support of a series of layers of cellulose ester of decreasing acyl content. Surprisingly, we discovered that the same effect was obtained if the surface of the temporary support was hydrolyzed as described below. Adhesion of the permanent support to the stripping layer was satisfactory if the solvent coating formula for the permanent support contained a small quantity of water.

A substantially fully esterified cellulose ester film approximately .0055 inch thick is provided as a temporary support, for example, cellulose triacetate film having maximum moisture resistance and containing about 43.5% acetyl. Other cellulose esters such as cellulose acetate butyrate, 31% acetyl and 15% butyryl, cellulose acetate propionate or cellulose propionate, etc., having equivalent properties and acyl content may be used. The film is superficially hydrolyzed preferably on only one surface by application of a solution of 3% sodium hydroxide containing from 40% to 90% methanol, a spreading agent and the balance water. Treatment is carried out until a stratum about .00002 inch thick has been hydrolyzed following which the film is washed and dried. As shown in Fig. 1 of the drawings, the support 10 now carries the hydrolyzed surface 11.

The stripping layer 12 of the water-soluble cellulose ester, for example, cellulose acetate containing 13–19% acetyl, preferably 17% acetyl, is applied from the following formula:

| | Per cent |
|---|---|
| Water soluble cellulose acetate (17% acetyl) | 1 |
| Acetone | 20 |
| Saponin | 0.1 |
| Water | 78.9 |

The layer applied is very thin and may be coated on conventional machines containing inclined drying sections, whereas similar glue stripping layers of the prior art require coating on special machines containing flat drying sections in order to prevent physical defects in the coating such as drying lines.

The permanent support layer 13, about .0001 to .0003 inch thick when dried down, is then coated over the stripping layer 12 in one or more applications to obtain the desired thickness, from the following formula:

|  | Per cent |
|---|---|
| Cellulose acetate butyrate | 4 |
| Acetone | 55 |
| Water | 5 |
| Butyl acetate | 36 |
| Dibutyl phthalate | 0–2 |

The cellulose acetate butyrate we prefer may be described as containing approximately 12–13% acetyl and 36–38% butyryl. Other cellulose organic acid esters may be used such as cellulose acetate propionate, cellulose acetate, etc., but cellulose acetate butyrate is preferred because of its high moisture resistance and high dimensional stability. The cellulose organic acid esters, particularly cellulose acetate butyrate, are also used for the permanent support because the photographic emulsion subsequently applied undergoes less deterioration on keeping than is the case when an ester such as cellulose nitrate is used. This cellulose ester need not be particularly water-permeable since we find that the stripping can be effective by penetration of water to the stripping layer from the edge of the sheet.

A thin subbing layer 14 of a mixture of gelatin and cellulose nitrate is then applied to the permanent support from the following formula:

|  | Per cent |
|---|---|
| Gelatin | 1.25 |
| Cellulose nitrate | 0.3 |
| Glacial acetic acid | 1.0 |
| Acetone | 50.0 |
| Water | 3.0 |
| Methanol | 44.45 |

In order to control curl in the product a pelloid coating may be applied to the rear surface of the support 10. This pelloid may be coated from an aqueous gelatin solution containing an antihalation dye and a spreading agent and may be secured to the temporary support by a preliminary subbing layer deposited from the following composition:

|  | Per cent |
|---|---|
| Gelatin | 1.25 |
| Cellulose nitrate | 0.6 |
| Glacial acetic acid | 1.0 |
| Acetone | 60.0 |
| Water | 3.0 |
| Ethylene dichloride | 5.0 |
| Methanol | 29.15 |

This formula and that used for applying subbing layer 14 may contain about 1.5% of the weight of gelatin of hydrated chromium chloride as a hardener. After application of subbing layer 14, the light-sensitive silver halide emulsion layer 15 is then coated over the subbing layer 14. It may be desirable to improve the dry adhesion between the permanent support and the stripping layer 12. This may be accomplished by adding a quantity of glue or gelatin to the above formula for layer 12 (about 25 to 50% based on the weight of water-soluble cellulose ester present together with about 1.0% acetic acid) or by the addition to the formula for the permanent support layer 13 of approximately 10–25% of the weight of cellulose acetate butyrate present of cellulose acid acetate butyrate. The latter is prepared either by the esterification of the oxidized cellulose or by the oxidation of cellulose acetate butyrate as described in the Kenyon and Yackel U. S. Patent 2,338,587, granted January 4, 1944.

The stripping film constructed as described above can be expected to strip apart during processing in two minutes or less, whereas a similar film having a glue stripping layer strips in about nine minutes. As mentioned, this is due partly to the use of water-soluble cellulose acetate in stripping layer 12 and partly because of the nature of the bond between the permanent support and the water-soluble cellulose acetate layer. The cellulose nitrate preferred in the above formula is a low viscosity ester highly soluble in methyl alcohol and containing about 11 to 12% nitrogen and prepared as described in Talbot U. S. Patent 2,118,275, granted May 24, 1938.

*Example 2*

A stripping film of relatively simple construction shown in Fig. 2 of the drawings is obtained by preparing a cellulose ester, particularly a cellulose acetate, film support 10 having a hydrolyzed surface 11 as described in Example 1. A cellulose nitrate layer is then coated from the following formula onto the hydrolyzed surface so as to yield the permanent support layer 16 about .0003 inch thick.

|  | Per cent |
|---|---|
| Cellulose nitrate | 5.25 |
| Acetone | 50.0 |
| Methyl Cellosolve | 10.0 |
| Water | 3.0 |
| Methanol | 31.75 |

Water appears to be essential in the above formula to obtain adequate adhesion to the hydrolyzed surface. The cellulose nitrate preferred is the low viscosity ester described in Example 1, although practically any cellulose nitrate may be used partly because one does not need to depend upon water permeability of the cellulose nitrate to obtain quick stripping. It may be desirable to improve the dry adhesion of the cellulose nitrate layer to the hydrolyzed surface in order to prevent lifting of this film during handling operations following emulsion coating. This may be accomplished by the addition to the above formula of about .05 to .1% gelatin together with 1% glacial acetic acid decreasing the methanol content correspondingly. This quantity of gelatin is equivalent to about 1 to 2% of the amount of cellulose nitrate present.

A gelatin subbing layer 14 may then be applied to the permanent support layer 16 from the following formula:

|  | Per cent |
|---|---|
| Gelatin | 1.0 |
| Glacial acetic acid | 1.0 |
| Water | 15.0 |
| Methanol | 83.0 |

If desired, a small quantity of gelatin or glue (about 0–1%) may be added to the hydrolyzing solution used for hydrolyzing the surface of the temporary support. The result is to obtain better dry adhesion between the permanent and temporary supports and the product strips faster than when gelatin is used in the cellulose nitrate permanent support.

The light-sensitive emulsion layer 15 is then applied to the subbing layer 14 by conventional methods. If desired, prior to sensitizing the product, a pelloid backing of gelatin may be applied to the rear surface of support 10 as described in Example 1. It will be noted that the stripping film just described is devoid of the usual stripping layer yet this film strips very quickly in photographic processing solution.

Any disadvantages residing in the use of the cellulose nitrate permanent support are outweighed by reduced manufacturing cost and the fact that the general quality of the product is improved.

It is to be understood that the disclosure herein is by way of example and that we consider as included in our invention all modifications and equivalents falling within the scope of the appended claims.

We claim:

1. A photographic stripping film comprising a surface hydrolyzed cellulose triacetate temporary support, a cellulose acetate butyrate permanent support releasably attached to the hydrolyzed surface of said temporary support by means of a water-soluble cellulose acetate layer, and a photographic emulsion layer permanently attached to said permanent support.

2. A photographic stripping film comprising a surface hydrolyzed cellulose triacetate temporary support, a cellulose acetate butyrate permanent support of an ester containing from about 12 to 13% acetyl and 36 to 38% butyryl, releasably attached to the hydrolyzed surface of said temporary support by means of a layer of a cellulose acetate containing from 13–19% acetyl, and a photographic emulsion layer permanently attached to said permanent support.

3. A photographic stripping film comprising a surface hydrolyzed cellulose triacetate temporary support, a cellulose acetate butyrate permanent support containing from 10–25% cellulose acid acetate butyrate releasably attached to the hydrolyzed surface of said temporary support by means of a water-soluble cellulose acetate layer, and a photographic emulsion layer permanently attached to said permanent support.

4. A photographic stripping film comprising a surface hydrolyzed cellulose triacetate temporary support, a cellulose acetate butyrate permanent support releasably attached to the hydrolyzed surface of said temporary support by means of a water-soluble cellulose acetate layer containing about 25–50% glue, and a photographic emulsion layer permanently attached to said permanent support.

GALE F. NADEAU.
CLEMENS B. STARCK.
CARL F. SMITH.

REFERENCES CITED

The following references are of record in the file of this patent:

UNITED STATES PATENTS

| Number | Name | Date |
| --- | --- | --- |
| 1,915,873 | Spencer | June 27, 1933 |
| 2,266,435 | Nadeau et al. | Dec. 16, 1941 |
| 2,276,151 | Brandenberger | Mar. 10, 1942 |
| 2,326,058 | Nadeau | Aug. 3, 1943 |
| 2,353,717 | Francis et al. | July 18, 1944 |